United States Patent [19]

Kunz

[11] Patent Number: 5,174,401
[45] Date of Patent: Dec. 29, 1992

[54] WEIGHTING SCALE HAVING IMPROVED YOKE MOUNTING MEANS

[75] Inventor: Peter Kunz, Gossau, Switzerland

[73] Assignee: Mettler-Toledo AG, Greifensee, Switzerland

[21] Appl. No.: 755,335

[22] Filed: Sep. 5, 1991

[30] Foreign Application Priority Data

Dec. 4, 1990 [CH] Switzerland .................. 3819/90

[51] Int. Cl.⁵ .................................................. G01G 7/00
[52] U.S. Cl. ......................................................... 177/212
[58] Field of Search ........................ 177/210 EM, 212

[56] References Cited

U.S. PATENT DOCUMENTS

| | | | |
|---|---|---|---|
| 3,955,638 | 5/1976 | Wasko | 177/212 |
| 4,090,575 | 5/1978 | Kunz | 177/212 |
| 4,148,370 | 4/1979 | Lüchinger et al. | 177/212 |
| 4,280,577 | 7/1981 | Kunz | 177/212 |
| 4,429,757 | 2/1984 | Kunz | 177/212 |
| 4,722,409 | 2/1988 | Kunz | 177/212 |
| 4,799,561 | 1/1989 | Komoto | 177/212 |

Primary Examiner—George H. Miller, Jr.
Attorney, Agent, or Firm—Laubscher & Laubscher

[57] ABSTRACT

Weighing apparatus of the electromagnetic load compensation type includes a ferromagnetic yoke member (19), that is secured at a single point to the frame (3), thereby a permit the frame to be formed of a non-ferromagnetic material, such as aluminum, having a different coefficient of expansion than the yoke member. Preferably the yoke member is secured to the frame by a single screw (33,103) arranged at the axis of symmetry of the yoke member. Owing to the small contact surface between the yoke member and the frame, the production of temperature-responsive forces which would otherwise stress or distort the apparatus to adversely affect the accuracy of the weighing operation is avoided.

8 Claims, 1 Drawing Sheet

WEIGHTING SCALE HAVING IMPROVED YOKE MOUNTING MEANS

STATEMENT OF THE INVENTION

This invention relates to weighing apparatus of the electromagnetic load compensation type including improved means for connecting the ferromagnetic yoke member at a single point to the frame, whereby the frame may be formed of a material, such as aluminum, or an aluminum alloy, having a coefficient of expansion that differs from that of the yoke member.

BRIEF DESCRIPTION OF THE PRIOR ART

Weighing systems of the load compensation type are well known in the patented prior art, as evidenced by the inventor's prior U.S. Pat. Nos. 4,090,575, 4,280,577, 4,429,757 and 4,722,409, among others.

In the weighing systems of the prior art, it has been proposed to form the frame and the housing of the measurement cell from aluminum or an aluminum alloy. In weighing scales of the aforementioned electromagnetic load compensation type, however, various components—such as the yoke member of the permanent magnet means—are formed of a ferromagnetic material (specifically iron). As the scale is operated, the parts of the permanent magnet system that consist of aluminum and especially the parts of the permanent magnet system that are made up of iron material are heated up. Because of the temperature changes, these parts expand unevenly on account of their differing coefficients of expansion, thereby producing system-bending forces that can cause measurement errors, especially in the case of high-resolution scales. Bending of system parts occurs not only if the permanent magnet system is firmly connected with one housing part in several places, (such as shown, for example, in German laid-open patent application No. 713636), but also when, between the housing and the permanent magnet system, a spacing ring (U.S. Pat. No. 3,955,638) or several spacing sleeves (Luechinger U.S. Pat. No. 4,148,370) are used, which, in several places, are rigidly connected both with the housing and with the permanent magnet system.

From the Komato U.S. Pat. No. 4,799,561, it is known to provide a force-compensating scale where the problem of differing degrees of expansion of the measurement cell and the permanent magnet system is addressed. It is proposed in this reference that the block holding these elements no longer be made as a single piece, but rather that it be made of a combination of two vertically arranged sheet metal pieces, a spacing holder being clamped between both sheet metal pieces.

In these known scales, the permanent magnet system is always connected in relatively large surface-to-surface contact with the frame or the housing of the scale. This is why differing degrees of expansions of both parts produce a system-bending effect.

The present invention was developed to reduce as much as possible the forces acting upon the system caused by the differing heat expansion properties of the permanent magnet system and the housing parts. This problem is solved by means of a scale that is characterized by the fact that the combination of the permanent magnet system with the housing takes place in a single point.

SUMMARY OF THE INVENTION

Accordingly, a primary object of the present invention is to provide a weighing scale of the electromagnetic load compensation type including means for connecting the ferromagnetic yoke member at a single point to the supporting frame, whereby the frame may be formed from a material having a different coefficient of expansion than that of the yoke member.

The scale according to the invention offers the advantage that—by connecting the permanent magnet system at a single point—in spite of differing expansion of the two areas that touch each other at the point of connection or contact, only extremely small deleterious forces can be transmitted to the system and especially only within a very limited area, so that there will be no deleterious bending that could otherwise influence the measurement result beyond the tolerance limit.

According to a more specific object of the invention, the single portion of the yoke member that is connected with the frame is arranged at the axis of symmetry of the yoke member, thereby introducing the least possible stress that would otherwise produce bending of the frame. Moreover, by the use of a single screw as the connecting means between the frame and the yoke member, the contact surface may be effectively limited to a relatively small annular area. In one embodiment, a spacer washer mounted concentrically on the screw serves as the contact surface between the yoke member and the frame, and in a second embodiment, an integral annular spacer rib is formed on the frame concentrically about the screw.

BRIEF DESCRIPTION OF THE DRAWING

Other objects and advantages of the invention will become apparent from a study of the following specification when viewed in the light of the accompanying drawings, in which.

DETAILED DESCRIPTION

Figure 1:
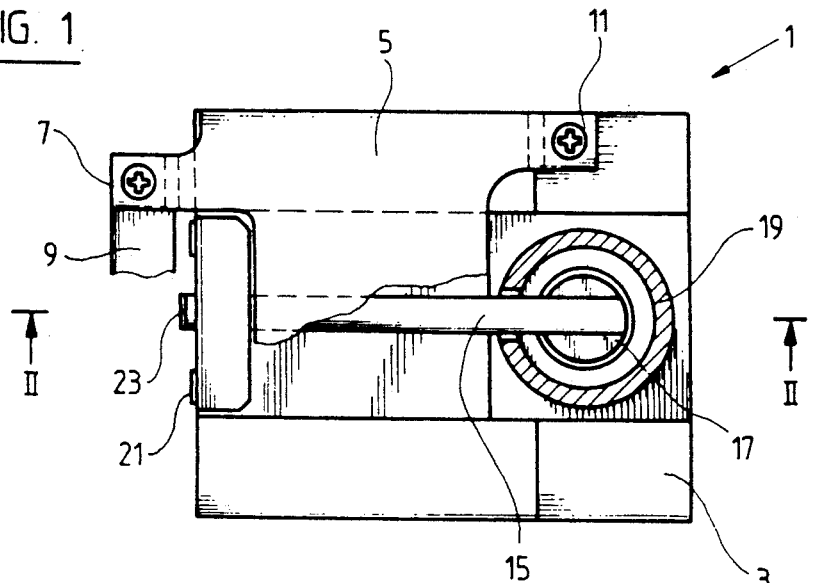
FIG. 1 is a top plan view, with certain parts broken away, of the electromagnetic load compensation weighing apparatus of the present invention.
Figure 2:
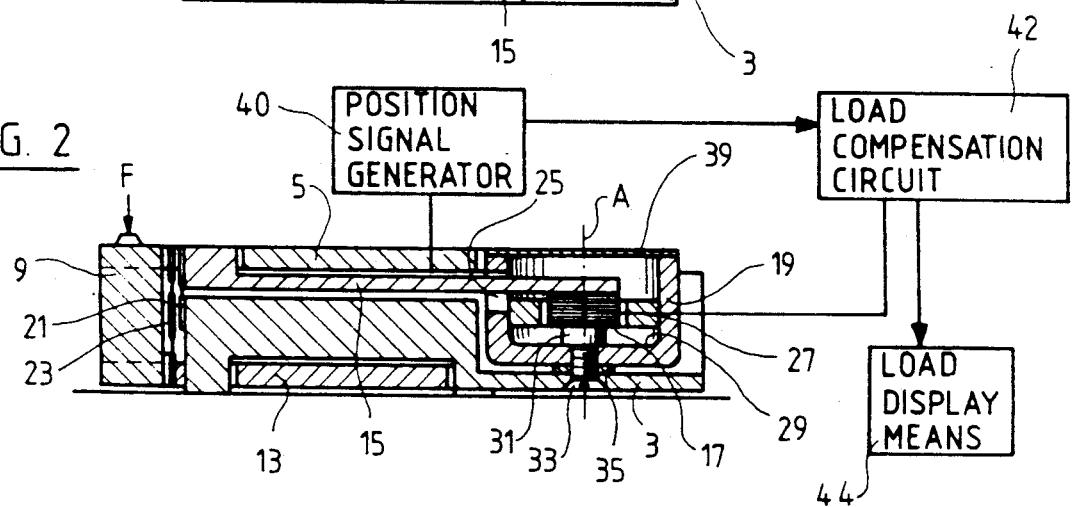
FIG. 2 is a sectional view taken along line 2—2 of FIG. 1.

Referring first more particularly to FIGS. 1 and 2, the weighing apparatus 1 is of the electromechanical load compensation type certain details of which—for example, the weighing pan housing, the weighing chamber, the keyboard, and the weighing pan —have been omitted for sake of simplicity. The apparatus includes a frame 3 to which are secured the upper and lower guide members 5 and 13, respectively, that are connected at one end with the frame 3 by the screw means 11, the other ends 7 of the guide members being connected with the load receiving member 9, as known in the art. The guide members 5 and 13 may be of the illustrated H-shaped configuration, or of a Y-shaped configuration, as desired. A force transmitting lever 15 is provided which is pivotally supported intermediate its ends by the flexure bearing resilient support means 21, the adjacent end of the lever 15 being connected with the load receiving member 9 by flexure bearing means 23. At its other end, the force transmitting lever 15 extends through an opening 25 contained in a wall portion of the dish-shaped ferromagnetic yoke member 19, the conventional electromagnetic load compensation coil 17 being secured to the end portion of lever 15 within the chamber defined within the yoke member 19. The yoke member 19, which is formed of a ferromagnetic material such as iron, contains an annular magnet 27 which cooperates with the yoke 19 to produce a permanent magnetic field within which the coil 17 is mounted. Coaxially mounted on the bottom wall 29 of the axis of symmetry of the yoke member 19 is an annular iron core member 31.

In accordance with a characterizing feature of the present invention, the yoke member 19 is secured to the frame 3 solely by a single screw member 33 arranged at the symmetrical axis A of the yoke member 19. The screw 33 includes a head portion arranged on one side of the bottom wall of frame 3, and the other end of the screw is threadably connected within a threaded bore contained on the axis of symmetry A of the yoke 19. A spacer washer 35 is arranged concentrically about the screw 33 intermediate the frame bottom wall 3 and the bottom wall 29 of the yoke member 19. Instead of the provision of a separate washer member 35, the bottom wall of the frame member 103 (FIG. 3) may be provided with an integral annular spacer rib portion 137 that is arranged concentrically about the screw 133. Preferably, the surface area of the spacer rib 137 of FIG. 3 or the spacer disc 35 of FIG. 2 is so small that, on the one hand, it is barely sufficient to support the yoke member and to reliably connect the same to the frame 3, whereas on the other hand, it is sufficiently small to prevent the formation of bending forces that might occur in the arrangement of components. Thus, the yoke member may be formed of a ferromagnetic material for conducting the flux of the magnetic field, whereas the frame 3 may be formed of a suitable non-ferrous material, such as an aluminum alloy, or aluminum.

Figure 3:
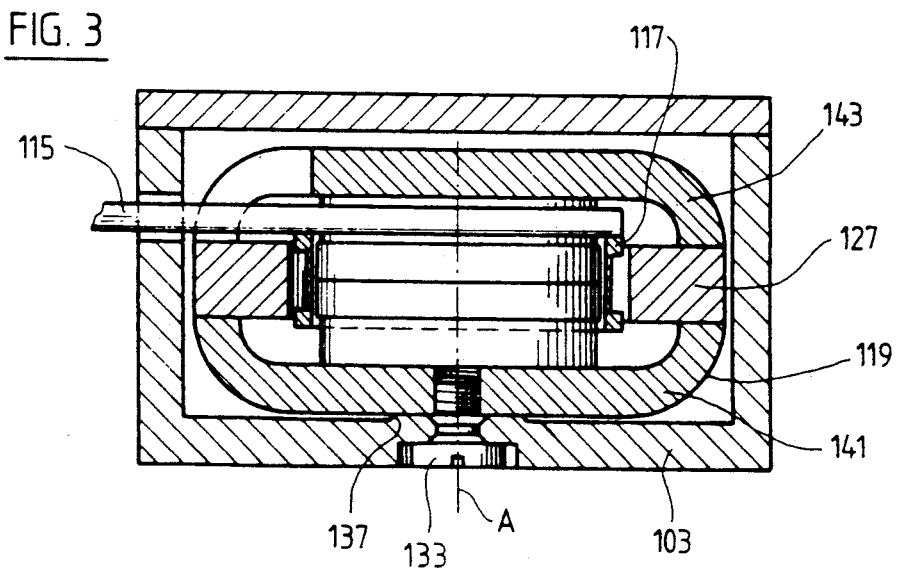
FIG. 3 is a detailed sectional view of the electromagnetic load compensation components of a second embodiment of the invention.

If desired, a top closure member 39 may be provided to close the top of the dish-shaped yoke member 19. In the embodiment of FIG. 3, the yoke member 19 includes two dish-shaped sections 141, 143 that face each other on opposite sides of the annular permanent magnet member 127. Thus, the force-transmitting lever 115 extends through an opening contained in the upper yoke section 143, and carries the load compensation coil 117.

If desired, the yoke members 19 and 119, and the coils 17 and 117, could have a rectangular configuration, instead of the illustrated cylindrical configuration. Thus, as a consequence of the provision of the single screw means for connecting the yoke member to the frame, it is possible to use a material for the frame having a different coefficient of expansion than the ferromagnetic material from which the yoke member is formed, thereby eliminating the introduction of bending stresses into the apparatus upon temperature variation, which stresses otherwise would effect the accuracy of the measurement.

As known in the art, the position of the force-transmitting lever 15 relative to the frame 3 is measured by photoelectric position signal generator means 40, thereby to send a position signal to the load compensation circuit 42. The load compensation circuit transmits to coil 17 a load compensation current which normally tends to return the force-transmitting lever 15 and the load receiving means 9 to their initial no-load position. The magnitude of the electromagnetic load compensation current, as indicated by the load display means 44, is a measure of the load to be weighed that has been applied to the load receiving member 9.

While in accordance with the provisions of the patent statutes the preferred forms and embodiments of the invention have been illustrated and described, it will be apparent that various changes may be made without deviating from the inventive concept set forth above.

What is claimed is:

1. Electronic load measuring apparatus of the electromagnetic load compensation type, comprising:
   (a) a frame (3);
   (b) load receiver means (9) connected for movement relative to said frame from a normal no-load position upon the application thereto of a load to be measured;
   (c) load transmitting means (15) connected with said frame for movement by said load receiving means; and
   (d) electromagnetic load compensation means for normally biasing said load receiver means toward said no-load position, said load compensation means including:
      (1) means including a ferromagnetic yoke member (19) and a permanent magnet (27) for generating a magnetic field;
      (2) means including a single element (33, 133) connecting a single portion of said yoke member with said frame solely at a single point, whereby said magnetic field is fixed relative to said frame at bone single point only; and
      (3) an electrical coil (17) connected with said force transmitting means for movement in said magnetic field.

2. Apparatus as defined in claim 1 wherein said single yoke portion is symmetrically located relative to said yoke member.

3. Apparatus as defined in claim 1, wherein said single element comprises a screw.

4. Apparatus as defined in claim 3, wherein said includes a head portion on the side of said frame remote from said yoke member, said screw extending through an opening contained in said frame and including a portion threadably connected with a corresponding threaded bore contained in said yoke member.

5. Apparatus as defined in claim 4, wherein said frame includes an annular integral support rib (137) arranged concentrically about said screw for supporting said yoke member in spaced relation relative to said frame.

6. Apparatus as defined in claim 4, and further including a spacer washer (35) mounted concentrically about said screw intermediate said frame and said yoke member.

7. Apparatus as defined in claim 1, wherein said frame is formed of a non-ferromagnetic material.

8. Apparatus as defined in claim 7, wherein said frame is formed of aluminum.

* * * * *